The present invention relates to a control device for a vehicle. More particularly, it relates to a yaw control means for an aircraft.

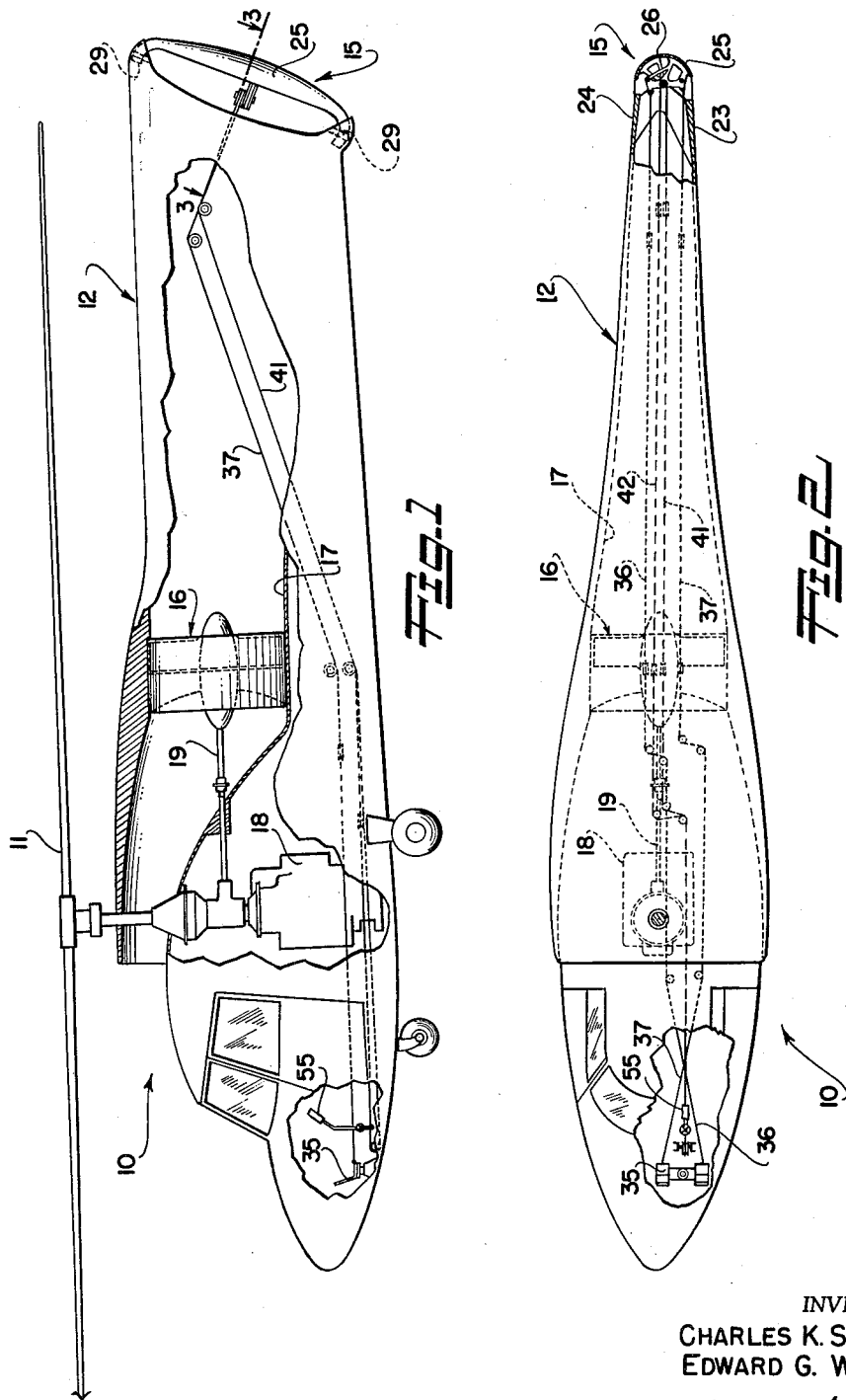

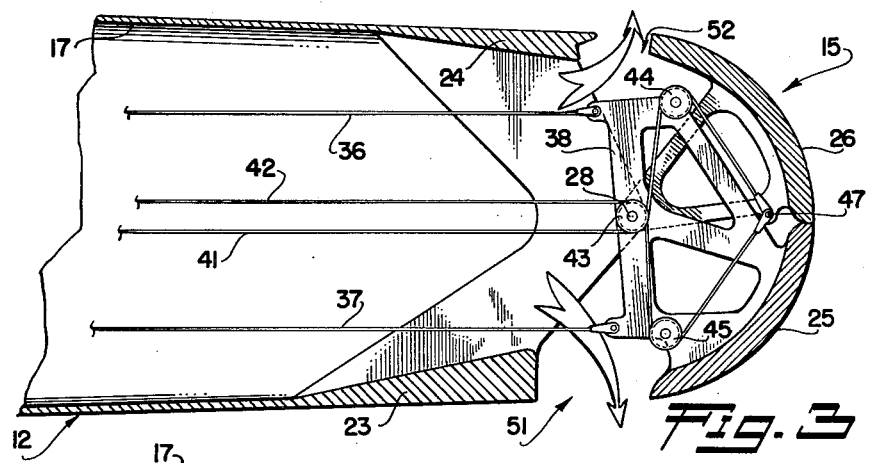
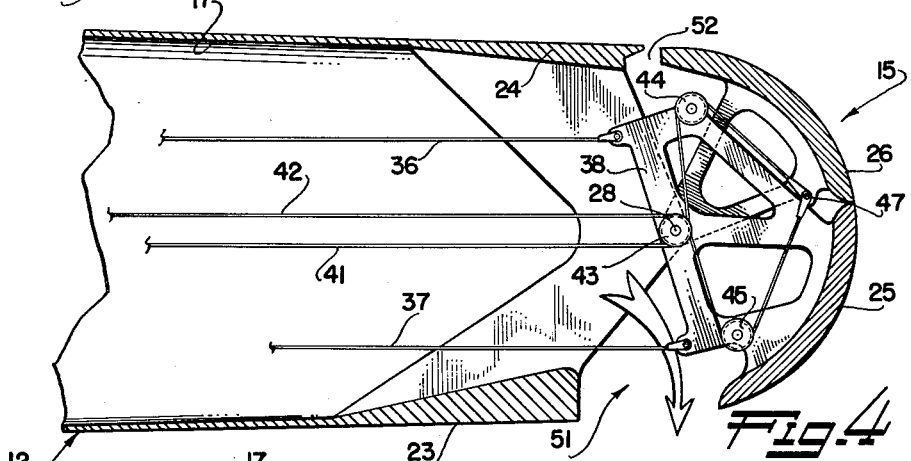
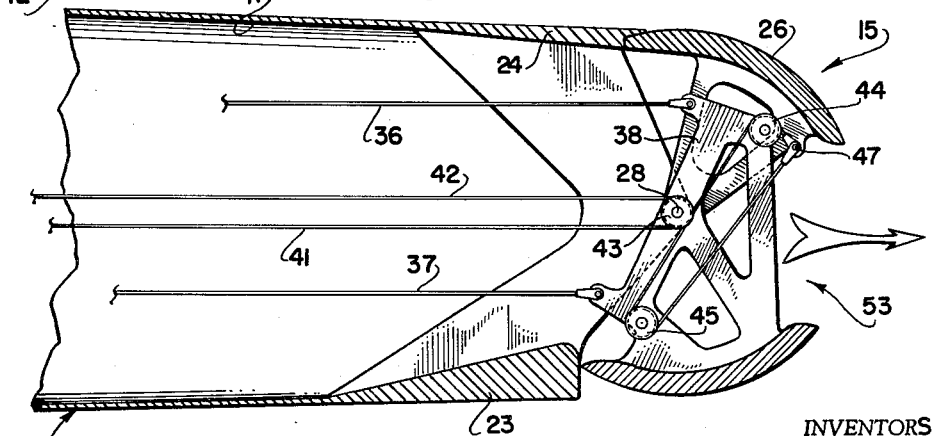
INVENTORS
CHARLES K. SPEARMAN
EDWARD G. WARD 3,047,254
CONTROL MEANS FOR VEHICLE
Charles K. Spearman, Van Nuys, and Edward G. Ward, Glendale, Calif., assignors to Lockheed Aircraft Corporation, Burbank, Calif.
Filed Mar. 14, 1960, Ser. No. 14,617
1 Claim. (Cl. 244—52)

In any vehicle which travels through a fluid medium, control means are necessary which are accurate and immediate in effect because of devious fluid currents. This is especially true in a vehicle which moves slowly at times, such as a helicopter. Devious air currents caused by gusts of air and swirling from the action of the main rotor makes control of a helicopter very difficult. In addition, a built-in torque problem exists because it is sustained in flight by a large rotor on a vertical axis. Because of the torque produced by the relatively large rotor, a delicate yaw control problem exists in the helicopter. It has been the practice to the present date to provide the helicopter with a tail boom extending aft from approximately the center of gravity with a variable pitch tail rotor mounted at the end on an axis tranverse to the tail boom and horizontal to the ground. The pitch of the tail rotor is varied to provide yaw control forces about the center of gravity of the helicopter. The problems of the use of the tail rotor for yaw control include frequent malfunction due to complexity of parts, vibration, noise, danger due to exteriorly moving parts and the need for a high skill in the operator of the aircraft.

It is therefore an important object of the present invention to provide a control means for a vehicle.

It is another object of the present invention to provide a control means for an aircraft having a minimum of exteriorly located moving parts. The reaction from a stream of high velocity air is used to provide control forces so that the exterior moving parts are limited to valve or nozzle means.

It is another object of the present invention to provide a control means for an aircraft which will permit control forces to be exerted around the center of gravity of the aircraft and through the center of gravity for thrust. A source of high velocity air is ducted to an extremity or a point spaced from the center of gravity and may be there directed laterally to a line from the center of gravity to the spaced position or parallel thereto for thrust.

Another object of the present invention is to provide a helicopter having yaw control means comprised of a directable nozzle and a tail boom of large vertical area so that during high speed forward flight, the area of the boom will act as a fin for directional control and high velocity air ducted through the nozzle means may be used for additional thrust.

Another object of the invention is the provision of an accurate and quick acting control means for movement of an arm about a pivotal axis. The action from a stream of high velocity air is utilized to move the arm about the axis. When no movement is desired, an equal amount of high velocity air is ducted to each side of the arm. When movement is desired, the volume of air passed to one side will be increased with a simultaneous decrease in flow to the other resulting in a large moment and instantaneous motion.

It is another object to provide a directing means for a stream of high velocity air permitting direction of it in any one of three directions in varying amounts simultaneously or singly with a constant back pressure.

Other advantages and objects of the present invention will become apparent from the reading of the following specification, especially when taken in conjunction with the appended drawings wherein like numerals equal like elements.

FIG. 1 is a side view of a helicopter-type aircraft embodying the present invention showing the control device as a yaw control means.

FIG. 2 is a plan view of FIG. 1.

FIG. 3 is a view taken on lines 3—3 of FIG. 1 showing the invention in yaw control position.

FIG. 4 is a view similar to that of FIG. 3 with the control in hover position.

FIG. 5 is a similar view to that of FIG. 3 with the control in a thrust or high speed position.

The present invention uses a source of high velocity air which is conducted to a position spaced from the center of gravity of the vehicle and there directed in order that the reaction from the high velocity air will cause a counteracting movement of the position about the center of gravity of the vehicle. Since accurate yaw control forces which have immediate response are necessary in a helicopter, the present invention has been illustrated on that vehicle.

In a conventional helicopter, the yaw control means consists of tail rotor having a variable pitch means so that thrust may be directed to one side or the other tail boom. A change of heading due to gusts from opposite sides of the craft required a complete change in pitch to correct. This change in pitch took a period of time during which there were no yaw control forces.

The present invention overcomes the problem of delayed reaction by means of a nozzle having directing doors which direct air to both sides of the tail boom simultaneously. When yaw forces are needed, the doors are controlled to increase instantaneously the amount of air passing to one side and at the same time, the amount of air passing to the opposite side of the tail boom is decreased. This provides the advantage of doubling the force effect of a control movement since the increase of one force is coincidental with the decrease of the opposite force. Quick reaction is obtained by this system because there is no necessity to switch 180 degrees from one side of the boom to the other as would be the case of a single orifice nozzle.

For maximum life and efficiency of a device to provide a source of high velocity air, it is necessary to provide some means so that back pressure to this high velocity source of air means is constant. Therefore, the present invention contemplates a set of doors of fixed area which are moveable to various positions to partially cover a downstream opening from a source of high velocity air. This effects a variable opening for directional control but maintains a constant area outlet for the air.

The helicopter 10 is shown with a main rotor 11 to provide forces for lift and horizontal motion. The tail boom 12, it will be noted, has a relatively large fin area. That is, the area from the top of the boom to the bottom of the boom is relatively large. To date, helicopter tail booms have generally been of skeleton construction as much as possible to prevent the influences of gusty air from blowing the craft off heading. However, the tail boom which has a large fin area is advantageous for directional control for high speed flight. The present invention makes possible the use of a tail boom having a large area.

The yaw control means is shown as nozzle 15 at the end of the tail boom 12 which is the point farthest removed from the center of gravity (generally through the rotational axis of the main rotor 11). High velocity air is provided by a rotary turbine compressor 16. This high velocity air is ducted through the duct 17 to the nozzle 15. A conventional engine 18 provides power for the main rotor 11 and to the compressor 16 through power takeoff 19 and appropriate shafts and couplings. The walls of the tail boom 12 at its aft end are terminated to form an opening through which the high velocity air from turbine 16 is conducted. The area defined by the opening is partially closed by the doors 25 and 26 which extend from the top to the bottom of the boom and are pivoted on axis 28 in bearings 29. Each door 25 and 26 has an arcuate cross section. Each closes or covers about a 90 degree arc about the pivotal axis 28.

As can be seen from an examination of FIG. 3, the doors 25 and 26 can be moved from an abutting relationship with each other to an abutting relation with adjacent side walls 23 and 24 as in FIG. 5. The rudder bar 35 in the cockpit of the craft provides means to move the door 25 through cables 36 and 37 to the cross bar 38 fixed to the door 25.

The position of door 26 relative to door 25 is controlled by the cables 41 and 42. The cable 41 extends around pulley 43, pulley 44 which is mounted generally on the right end of cross arm 38 and fixed at point 47 to the door 26 adjacent the abutting edge of door 25. The cable 42 extends around pulley 43, pulley 45 and is also fixed at point 47. Since pulleys 44 and 45 are mounted on the structure fixed to door 25, if cables 41 and 42 are stationary in their relationship with one another, the door 26 will be moved with the door 25 upon the movement of the rudder bar 35. During conditions of flight where yaw control is necessary through the rudder bar 35, the doors 25 and 26 will act as a unit to govern the amount of air passing through the openings 51 and 52. Thus, if it were desired to turn the heading of the helicopter to the left, the opening 51 would be widened and the opening 52 decreased, allowing a greater volume of air through 51 and less through 52. The reaction from the air passing through the opening 51 will cause the aircraft to be rotated counterclockwise about its center of gravity as seen in FIG. 2.

During all conditions except relatively high speed flight, the doors 25 and 26 will move together and the cables 41 and 42 will be inoperable. However, during high speed forward flight, the broad fin area of tail boom 12 will provide the largest amount of directional control. As the broad tail boom 12 moves through the air, the aerodynamic forces upon it will cause it to follow the center of gravity. There will be no further need for yaw control except within a limited range, therefore, it is desirable to use the high velocity air from the compressor 16 for additional forward thrust. This is done by opening the doors 25 and 26 against the adjacent walls 23 and 24 of the tail boom 12, which directs the high velocity air substantially straight aft. The means which causes door 26 to move away from door 25 is a speed control lever 55 in the cockpit. Movement of the lever 55 will cause the cable 41 to be shortened and the cable 42 to be lengthened. Shortening of cable 41 will cause the point 47 to move closer to the pulley 44 mounted approximately on the right end of cross bar 38 as seen in FIG. 3. When the increased length of cable required from pulley 43 around pulley 45 to point 47 is provided by a slackening of cable 42, the doors 25 and 26 will part. It will be seen that intermediate positions are possible but are not entirely necessary. During some speeds of transition, however, the lever 55 can be controlled as to provide an exit for the high velocity air through the openings 51, 52 and 53 simultaneously.

It will be noted that the wall 24 extends further aft than the wall 23. When the door 25 is abutting against wall 23 and door 26 against wall 24, the resultant opening 53, it is noted, is slightly displaced to the left from a line through the center of gravity and axis 28. A counterclockwise rotating rotor 11 will cause some torque toward the left in the tail boom 12. This is counterbalanced by pointing the opening 53 slightly left so that tail boom 12 follows exactly the center of gravity. Torque in the same direction exists during all conditions of flight. Thus, it can be seen by terminating wall 23 ahead of wall 24, opening 51 is larger than opening 52 during transition positions as seen in FIG. 3.

When there is no forward motion, the fin area of the tail boom 12 will be ineffective. Therefore, nearly all of the high velocity air will be directed to the left side of the boom as shown in FIG. 4.

A novel aircraft yaw control means has been disclosed which is accurate, highly responsive, safe, quiet and vibration free. It is not restricted to use on a helicopter. It may be used in conjunction with any craft which moves through a fluid medium, including those which travel underwater. The concept is not restricted to control movements about the vertical axis of a craft but may be used to exert control forces about the longitudinal and lateral axes.

Having disclosed the details of my device, we claim the following combinations of elements and their equivalents as our invention to which we desire the protection of a United States Letters Patent.

What is claimed is:

Control means for a vehicle comprised of a source of high velocity air, duct means from said source to a position spaced from the center of gravity of said vehicle, said duct means terminating at said position in a plane substantially perpendicular to the axis of said duct means to define an opening, a pair of closure doors, the area of each of said doors being equal, the total area of said pair of closure doors being less than the area of said opening, pivot means for said doors on an axis substantially perpendicular to a line from the center of gravity of said vehicle and said position, a cross bar fixed to one of said door means pivoted on said axis, means to oscillate said cross bar so as to direct said high velocity air, a first pulley at said axis, secondary pulleys on each end of said cross bar, a flexible cable extending from a control device around said first pulley, one of said secondary pulleys and being fixed to a point on the other of said door means, a second flexible cable extending from said control device, around said first pulley, the other of said secondary pulleys and fixed to said point so that said pair of door means may be controlled as a unit or separately by operation of said control device to direct said high velocity air to one or both sides of said opening or through the center of said opening to cause forces to be exerted against said vehicle lateral or parallel to a line from said center of gravity to said position.

References Cited in the file of this patent

UNITED STATES PATENTS 2,518,697    Lee _____ Aug. 15, 1950
2,735,264    Jewett _____ Feb. 21, 1956